2 Sheets—Sheet 1.

W. OVERSTREET.
Velocipede.

No. 225,760. Patented Mar. 23, 1880.

Attest:
A. M. Long
H. S. Abbot.

Wm. Overstreet,
Inventor
By Wm. C. Henderson & Co.
Attys.

N. PETERS, PHOTO-LITHOGRAPHER, WASHINGTON, D. C.

W. OVERSTREET.
Velocipede.
No. 225,760. Patented Mar. 23, 1880.
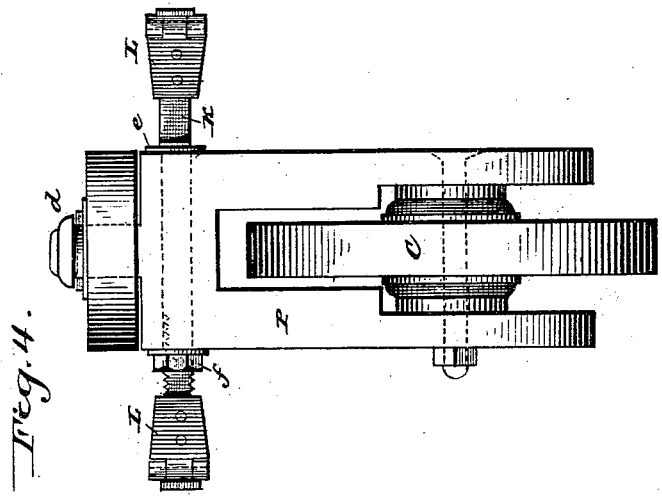
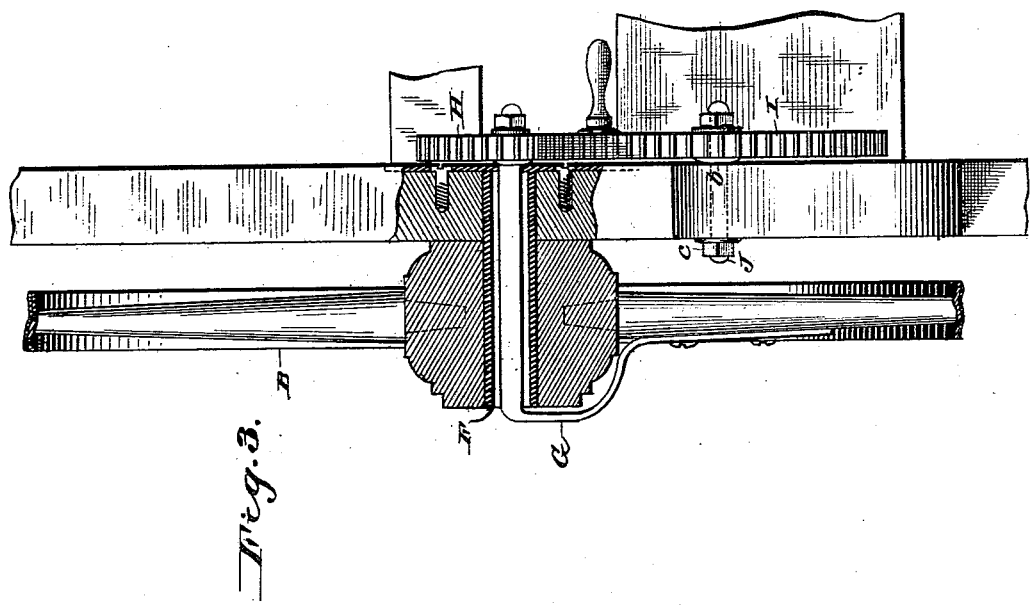

United States Patent Office.

WILLIAM OVERSTREET, OF BELTON, TEXAS.

VELOCIPEDE.

SPECIFICATION forming part of Letters Patent No. 225,760, dated March 23, 1880.

Application filed December 13, 1879.

*To all whom it may concern:*

Be it known that I, WILLIAM OVERSTREET, of Belton, in the county of Bell and State of Texas, have invented certain new and useful Improvements in Velocipedes or Hand-Wagons; and I do hereby declare that the following is a full, clear, and exact description of the invention, which will enable others skilled in the art to which it appertains to make and use the same, reference being had to the accompanying drawings, and to the letters of reference marked thereon, which form a part of this specification, in which—

Figure 1:
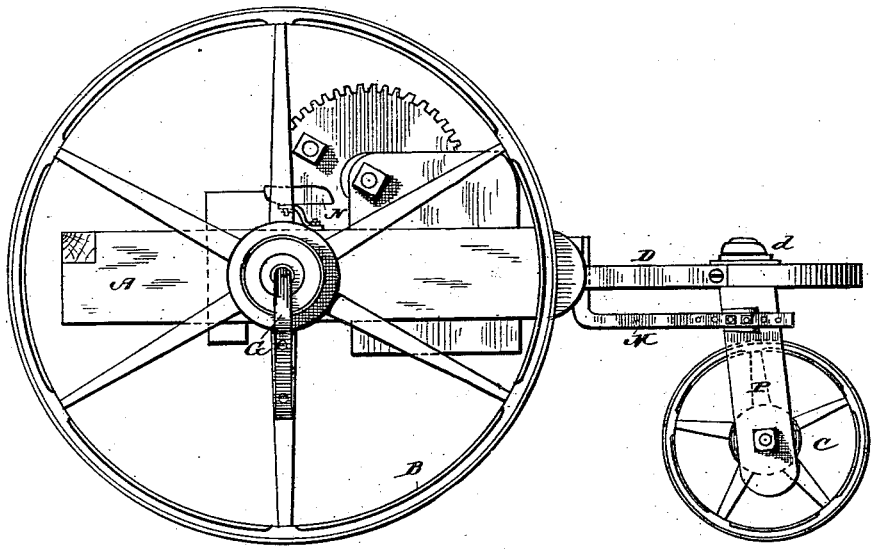
Figure 2:
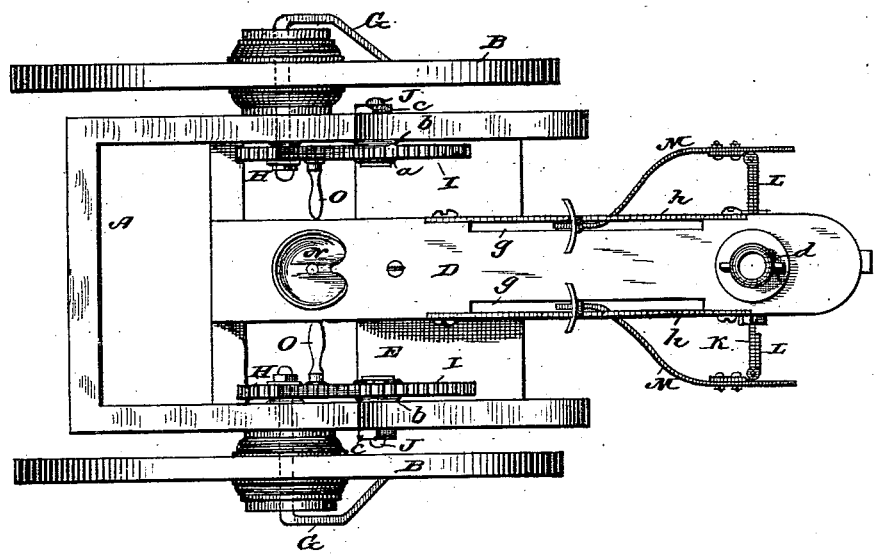

Figure 1 is a side elevation of the velocipede or hand-wagon; Fig. 2, a plan view; Fig. 3, a section through the hub of one wheel and a part of one side of the wagon-body, and Fig. 4 a front elevation of the front or guide wheel.

My invention relates to velocipedes or wagons propelled by hand-power; and it consists in the construction and arrangement of parts by means whereof the propelling power is applied to the drive-wheels; also, in the construction of and application to the guide or steering wheel of the mechanism for controlling the same.

In the accompanying drawings, the letter A indicates the body of the machine; B, the drive-wheels, and C the guide or steering wheel, which is connected to the body of the machine by a reach, D, that is screwed, bolted, or otherwise firmly secured to the cross-pieces E of the body.

The drive-wheels B are journaled on hollow spindles F, which are rigidly secured to and pass through the sides of the body A. A shaft, G, is passed through each of these spindles, and the end thereof that projects beyond the outside of the drive-wheel hub is bent at right angles and obliquely to its length and screwed or otherwise fastened to the wheel or to one of its spokes, as illustrated in the drawings, while to the other end there is keyed or bolted a pinion, H. The teeth of this pinion mesh with the teeth of a wheel, I, which is journaled on a shaft, J, that is passed through and bolted to the side of the body A. This shaft is provided with a flange, $a$, on one end and screw-threads on the other, and a washer, $b$, fits around it between the hub of wheel I and the side of body A, so as to form flange-guides for the wheel and hold the same steady. The shaft is held in place by means of a nut, $c$, screwed onto the threaded end thereof.

By the construction described the wheel I is free to turn on its shaft; but the shaft may be made to turn with the wheel, any well-known construction for that purpose being adopted.

The reach D at its forward end is, by means of a swivel-connection, $d$, connected with a bifurcated standard, P, which is supported on the axles of the guide or steering wheel C. A cross pin or bar, K, is passed through the upper part of standard P, and is held in place by a shoulder or collar, $e$, formed near one end, and a nut, $f$, screwed onto the other end, which is threaded, and all of which is illustrated in Fig. 4 of the drawings. This pin may be flat, round, octagonal, or other shape, so as not to turn in its bearings, and to each end there is riveted or bolted one leaf of a hinge, L, to the other leaf of which is bolted one end of the foot-levers M. That end of these levers which is bolted to the hinge is provided with a series of holes, so that the length of the levers may be adjusted by shifting the connecting-bolt from one hole to another. The other end of the levers is passed through longitudinal slots $g$, formed in the reach D. These slots I make, preferably, by cutting pieces out of the sides of the reach, and then screwing or otherwise securing metal plates or bars $h$ thereover, as shown in Fig. 2; but any other way will answer.

A seat, N, is formed on the reach D, a little in advance of the shaft of pinion H, and when the occupant thereof seizes the handles O of the wheels I, and turns the same, motion is imparted, through pinion H and its shaft, to drive-wheels B, and the device in that way is propelled. The feet of the occupant rest against the ends of levers M, and by pushing forward one or the other the machine is guided to the right or left, according as the left or right lever may be pushed forward.

This velocipede or hand-wagon can be made at little cost, and can be run over ordinary wagon-roads with the expenditure of little physical force, carrying at the same time double (if not more) the weight of the operator, and making from seven to ten miles per hour.

Having described my invention, what I claim is—

1. The body A and wheels B and I, in combination with shaft G, passed through wheel B and secured thereto, as described, and provided at one end with pinion H, for the purposes set forth.

2. The combination of body A, drive-wheel B, hollow spindles F, pinion H, and its shaft G, the last passed through the spindles and secured to the drive-wheels, substantially as set forth.

3. The body A and cogged wheel I, in combination with spindle F, drive-wheels B, and shaft G, connecting drive-wheels and pinion H, substantially as set forth.

4. In a velocipede or hand-wagon, the steering-wheel, in combination with its operating-levers, constructed to admit of horizontal adjustment, so as to lengthen or shorten the same, as described.

5. The within-described velocipede or hand-wagon, composed of body A, supported on drive-wheels B, provided with hollow spindles F, a shaft, G, connected to wheels B and H, as described, reach D, bifurcated standard P, steering-wheel C, and hinged levers M, admitting of adjustment, as described, for the purpose set forth.

In testimony that I claim the foregoing as my own I affix my signature in presence of two witnesses.

WILLIAM OVERSTREET.

Witnesses:
ED. J. RANCIER,
R. W. GREATHOUSE.